(12) United States Patent
Shonnard

(10) Patent No.: US 6,672,039 B1
(45) Date of Patent: Jan. 6, 2004

(54) APPARATUS AND METHOD FOR CUTTING AND HARVESTING INFESTATIONS OF AQUATIC VEGETATION IN SHALLOW AREAS OF WATER BODIES

(76) Inventor: Clarence W. Shonnard, 7 Dugway La., Vergennes, VT (US) 05491

( * ) Notice: Subject to any disclaimer, the term of this patent is extended or adjusted under 35 U.S.C. 154(b) by 0 days.

(21) Appl. No.: 10/244,282

(22) Filed: Sep. 16, 2002

(51) Int. Cl.$^7$ .............................................. A01D 44/00
(52) U.S. Cl. ............................................................ 56/8
(58) Field of Search ............................... 56/8, 202, 201, 56/194; 15/1.7; 294/66.1; 37/313, 310, 345

(56) References Cited

U.S. PATENT DOCUMENTS

| | | | | |
|---|---|---|---|---|
| 83,749 A | * | 11/1868 | Williams | 56/344 |
| 88,144 A | * | 3/1869 | Dismukes | 56/129 |
| 592,985 A | * | 11/1897 | Farmer | 56/8 |
| 734,571 A | * | 7/1903 | Knapp | 37/316 |
| 1,703,402 A | * | 2/1929 | Matsuoka | 56/8 |
| 2,065,733 A | | 12/1936 | Pearson | |
| 2,702,975 A | | 3/1955 | Friesen | |
| 2,790,297 A | | 4/1957 | Gardner | |
| 3,084,309 A | * | 4/1963 | Wiegardt, Jr. | 37/316 |
| 3,238,708 A | | 3/1966 | Zickefoose | |
| 3,601,956 A | | 8/1971 | Akermanis | |
| 3,863,237 A | | 1/1975 | Doerr | 15/1.7 |
| 3,979,146 A | * | 9/1976 | Berg | 209/418 |
| 4,070,978 A | * | 1/1978 | Virgilio | 114/26 |
| 4,137,693 A | | 2/1979 | Thompson et al. | 56/8 |
| 4,375,299 A | | 3/1983 | Laven | 294/19 R |
| 4,583,353 A | | 4/1986 | Shaver | 56/8 |
| 4,616,588 A | | 10/1986 | Caddick | 114/162 |
| 4,696,149 A | | 9/1987 | Hawk | 56/8 |
| 4,713,929 A | * | 12/1987 | Smith | 56/8 |
| 4,813,377 A | * | 3/1989 | Riche | 37/316 |
| 4,852,337 A | | 8/1989 | Peterson | 56/8 |
| 4,945,996 A | | 8/1990 | Codding | 172/233 |
| 4,999,982 A | | 3/1991 | Kriger | 56/8 |
| 5,031,390 A | * | 7/1991 | Bryant | 56/8 |
| 5,146,997 A | * | 9/1992 | Korin | 172/42 |
| 5,189,867 A | | 3/1993 | Schmidt | 56/8 |
| 5,287,935 A | | 2/1994 | Foeller | 172/136 |
| 5,404,696 A | | 4/1995 | Vasby | 56/9 |
| 5,493,850 A | | 2/1996 | Torkelson | 56/8 |
| 6,250,054 B1 | | 6/2001 | Kramer | 56/8 |

FOREIGN PATENT DOCUMENTS

| | | | | |
|---|---|---|---|---|
| NO | 52906 | * | 8/1933 | 56/8 |
| RU | 141037 | * | 3/1961 | 56/8 |

\* cited by examiner

*Primary Examiner*—Thomas B. Will
*Assistant Examiner*—Alicia Torres
(74) *Attorney, Agent, or Firm*—George O. Saile; Stephen B. Ackerman (57) ABSTRACT

A harvester and method for cutting and harvesting bottom growing aquatic vegetation in shallow areas of water bodies, such as lakes. The harvester is manually operated. The harvester moves on wheels and is capable of being adjusted to cut the aquatic vegetation at a desired height that does not disturb the water bottom ecology. The vegetation is collected on the harvester, removed from the harvester, dewatered and used for compost in garden and agricultural activities.

18 Claims, 9 Drawing Sheets

FIG. 6A (SIDE VIEW)

FIG. 6B (PLAN VIEW)

FIG. 6C (SIDE ELEVATION)

FIG. 6D (PLAN VIEW)

FIG. 7A
(SIDE ELEVATION VIEW)

FIG. 7B
(FRONT ELEVATION VIEW)

APPARATUS AND METHOD FOR CUTTING AND HARVESTING INFESTATIONS OF AQUATIC VEGETATION IN SHALLOW AREAS OF WATER BODIES

BACKGROUND OF THE INVENTION (1) Field of the Invention

The invention relates to an apparatus and method for cutting and harvesting infestations of bottom growing aquatic vegetation in shallow areas of water bodies.

(2) Description of the Prior Art

Bottom growing nuisance aquatic plants degrade waters for swimming, boating, fishing, aesthetic and health aspects by lake users and waterfront property owners. Currently these plants can be removed by physical, mechanical, chemical and biological methods each with significant drawbacks.

Physical methods, such as barriers disturb water-bottom ecology and often result in gassing of decomposing plant like vegetation under the barrier. Examples of such mat material are filtration mats, discarded rugs and thin sheets of metal plate.

Mechanical bottom cutting and drag devices such as commonly used rake like tools and typical garden type cultivators that have transverse bars, tines and handles stir up bottom sediments which release nutrients back into the waters and disturb water bottom ecology. These nutrients enhance further aquatic plant growth and digging up the bottom sediments can have a negative impact on the lake bottom ecology.

The following patents are examples of bottom, metal, drag-type cutters which dig up bottom sediment as well as not integrally harvesting the floating cut aquatic plants. These floating plants can then reestablish themselves in other areas of the water body. A further disadvantage of these water bottom drag-type cutters is that they are prone to be blocked or other wise interfered with during cutting by rocks, logs and debris that have accumulated on the lake bottom. U.S. Pat. No. 6,250,054 Kramer; U.S. Pat. No. 2,065,733 Pearson; U.S. Pat. No. 2,702,975 Friesen; U.S. Pat. No. 2,790,297 Gardner; U.S. Pat. No. 3,601,956 Akermanis; U.S. Pat. No. 3,601,956; U.S. Pat. No. 4,137,693 Thompson et al; U.S. Pat. No. 4,375,299 Laven; U.S. Pat. No. 3,863,237 Doer; U.S. Pat. No. 4,696,149 Hawk; U.S. Pat. No. 4,852,337 Peterson; U.S. Pat. No. 5,189,867 Schmidt; and U.S. Pat. No. 5,493,850 Torkelson; each show methods for cutting plants using a drag bar with a cutting edge. U.S. Pat. No. 4,999,982 Kriger describes the use of a dragging bar grate for cutting aquatic plants. U.S. Pat. No. 4,583,353 Shaver shows a triangular drag bar for cutting plants.

Chemical and biological methods are under investigation. However, there is concern about these methods, because of questions of effectiveness, damage to water ecology, known and unknown water related human health impacts and possible liability considerations for the user.

Another type of plant cutting involves the commercial mechanical lake weed harvesters having reciprocating knives and conveyors. These machines are heavy, complicated, costly and hazardous. Further, these machines are unworkable in shallow areas of lakes and other bodies of water, because of hydraulic boat draft problems resulting in grounding of the harvester and engine cooling water problems from intake of lake bottom sediments into the engine. Examples of commercial powered and mechanized lake weed harvesters are U.S. Pat. No. 4,616,588 Caddick; U.S. Pat. No. 3,238,708 Zickeford; and U.S. Pat. No. 5,404,696 Vasby. These harvesting units are expensive, require considerable maintenance, need US Coast Guard permits in US navigable waters and require marine Workman's Compensation insurance under the Jones Act.

There are also wheeled garden rakes that are used on dry land. Codding U.S. Pat. No. 4,945,996 and Foeller U.S. Pat. No. 5,287,935 are examples of such dry land garden rakes.

SUMMARY OF THE INVENTION

A principal object of the present invention is to provide an effective and very manufacturable at a reasonable cost apparatus and method for using the same for cutting and harvesting infestations of aquatic vegetation in shallow areas of water bodies, such as lakes.

A further object of the invention is to provide an improved, versatile, light-weight multifunctional harvesting device and method for bottom growing aquatic plants that minimizes the problems of the current practices and can be operated manually by one person in shallow waters.

A further object of the invention provides an economical, versatile, aquatic plant harvester with optional cutting method attachments that can be operated by one person in water body shallows to maintain a quality of water suitable for swimming, boating, fishing and other recreation uses and enjoyment.

A still further object of the present invention is to provide an improved multifunctional mobile harvesting device for lake bottom growing plants and methods that guide plant stems into a cutting device above the water body bottom in shallow areas, collects the cut aquatic plants for transport to onshore sites and eventual use in composting for garden and agricultural activities, that can be operated by one person with or without onshore power devices and that removes phosphorus contained in the cut vegetation from the water body.

These objects are accomplished by providing an improved harvesting apparatus that cuts aquatic plants at a predetermined distance above the lake or the like bottom using a planar horizontal deck with a plurality of closely spaced planar metal bars that efficiently guide the plant stems into confined spaces between the plurality of transverse bars until the stems become compacted within the spaces between the bars and eventually against the transverse stainless steel filaments positioned at a predetermined distance from the distal end of the metal deck bars where the steel filaments cut the wedged plant stems. The harvesting device with planar metal deck bars and transverse cutting filaments provide underwater cutting of the plant stems by movement of the harvester in either the forward or the reverse direction of motion with attachable cutting devices at both ends of the harvester.

A flexible plastic grid integral with the harvester collects the cut aquatic plants containing phosphorus and retains the plants until transported on the harvester to an onshore location for manual dumping by simple removal of the appropriate segments of the flexible plastic grid to the front or to the back of the harvester. The cut plants can then be dewatered, composted and the contained phosphorus used for garden or other agricultural purposes.

The harvester can be provided with wheels and air-filled tires for easy mobility and buoyancy adjustment that can be moved by one person across the bottom of the water body to minimize the disturbance of the lake bottom sediment ecology as well as passing over obstacles of rocks, logs and debris on the lake bottom.

The harvester can be operated by one person using a rigid handle that can move up or down vertically over a 180 degree arc for pulling or pushing the harvester apparatus in the forward or reverse direction as needed, with or without the use of onshore auxiliary power and that cuts aquatic plants moving in either direction. The accessory plant cutting attachments needed for variation in plant stem cutting characteristics can be attached, such as with bolts to either end of the harvester deck.

The harvester buoyancy is balanced by the apparatus's weight and hydraulic buoyant forces by use of pneumatic tires on wheels and other floatation and/or weight addition devices added to the deck that optimizes wheel penetration into the bottom sediments thereby enhancing manual mobility of the harvester by one person in shallow waters. This also minimizes the disturbance of the water body bottom sediment ecology.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose the novel multifunctional manual mobile harvesting device for lake or the like bottom growing plants and methods that guide the plant stems into a cutting device above the water body bottom in shallow areas, collects the cut aquatic plants for transport to onshore sites. Eventually the collected plants can be composted for garden and agricultural use. This removes phosphorus contained in the cut vegetation from the water body. The harvester can be operated by a single person with or without onshore power devices.

Figure 1:
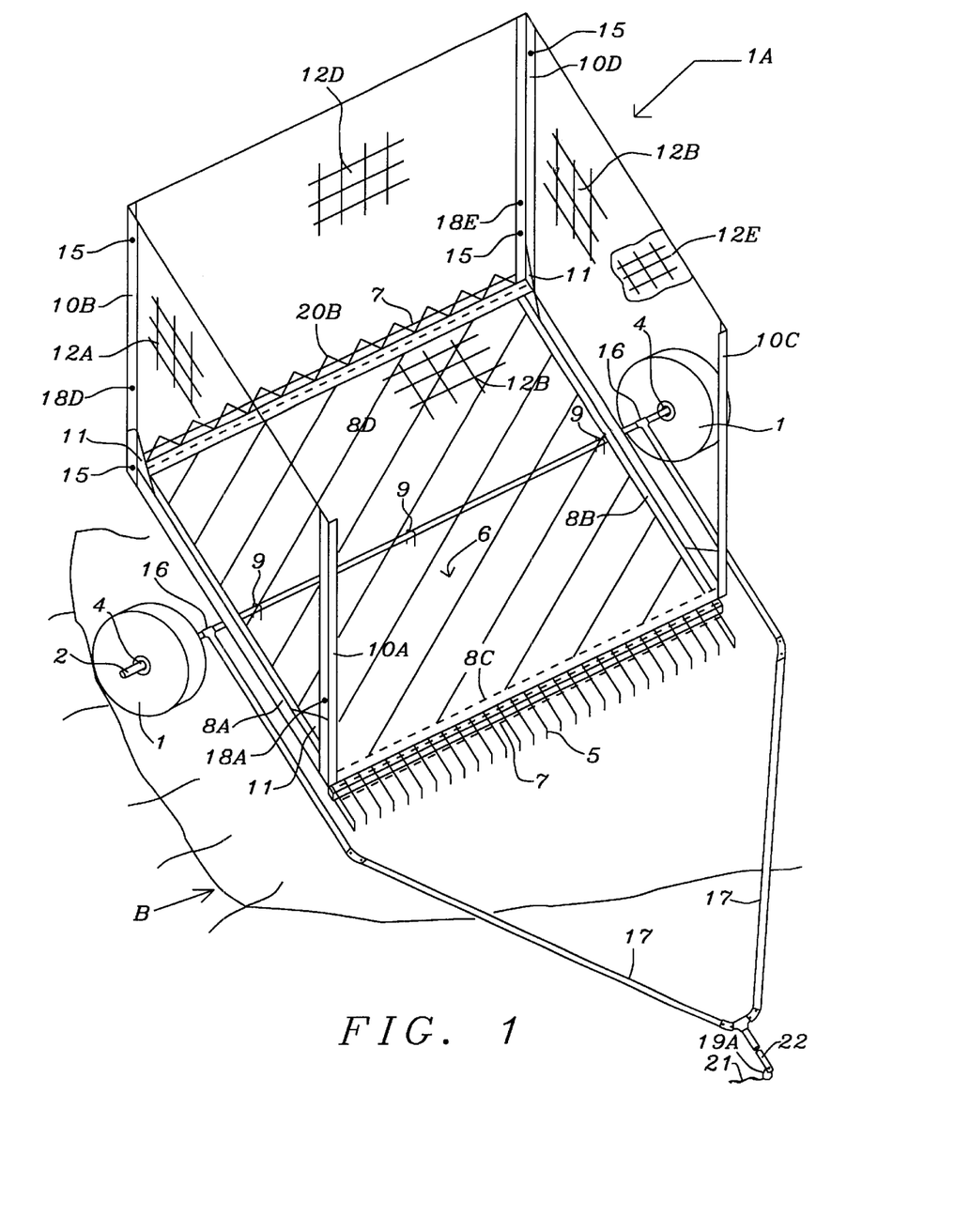
FIG. 1 is a perspective view of the aquatic plant cutting and harvesting apparatus of the present invention.

Referring now more particularly to FIGS. 1 through 7B and in particular to FIG. 1 there is illustrated a mobile, multifunctional apparatus and method for cutting and harvesting nuisance bottom growing aquatic plants. The harvesting apparatus includes a frame 6 attached to an axel 2 by for example "U" bolts 9. Wheels 1 on axel 2 are held in place by washers 4 and cotter pins 3 to provide mobility for the harvester 1A.

Figure 2A:
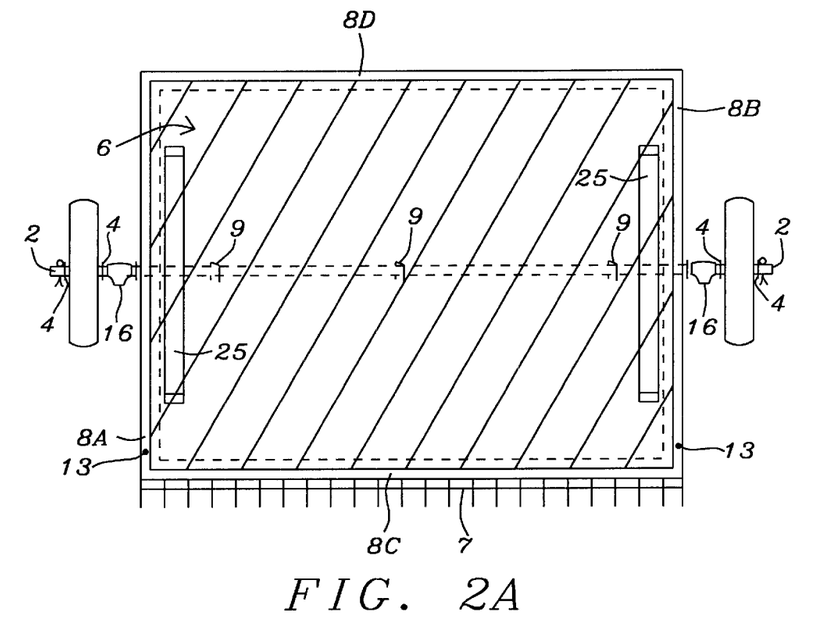
FIG. 2A shows a plan view of the harvesting apparatus including the floatation and/or weight adjustment device of pipe tube being sand or air filled.
Figure 2B:
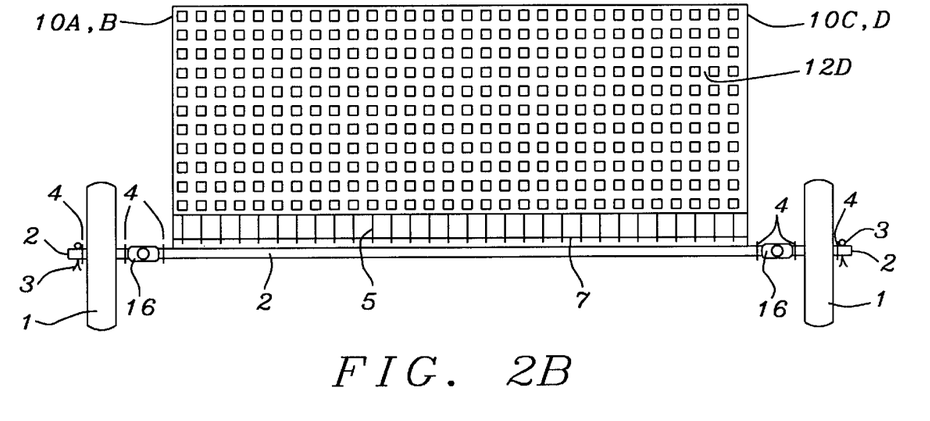
FIG. 2B is a front elevation view of the apparatus showing the relationship of the plant cutting filament to the water body bottom.
Figure 2C:
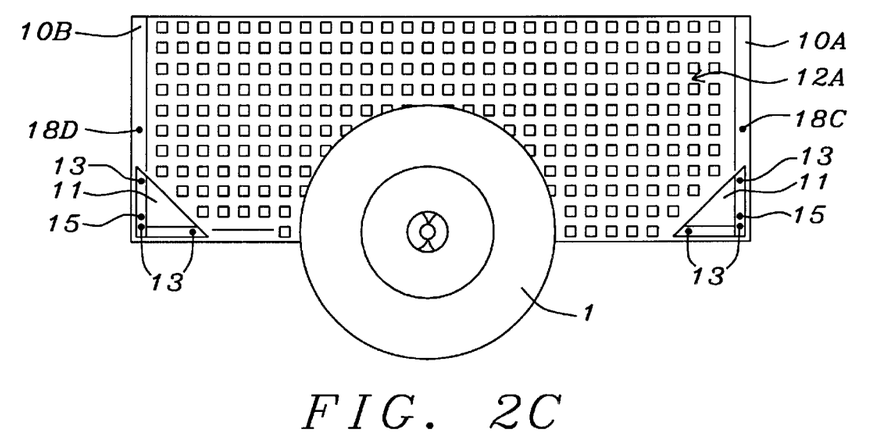
FIG. 2C is a side elevation view of the apparatus showing the vertical angle bars supporting flexible plastic grid or net for collecting cut plants.

Referring additionally to FIGS. 2A, 2B and 2C wherein FIG. 2A is an overhead view, FIG. 2B is a front elevation view and FIG. 2C is a side elevation view of harvester 1A of FIG. 1 without the push/pull handle 17.

Figure 3:
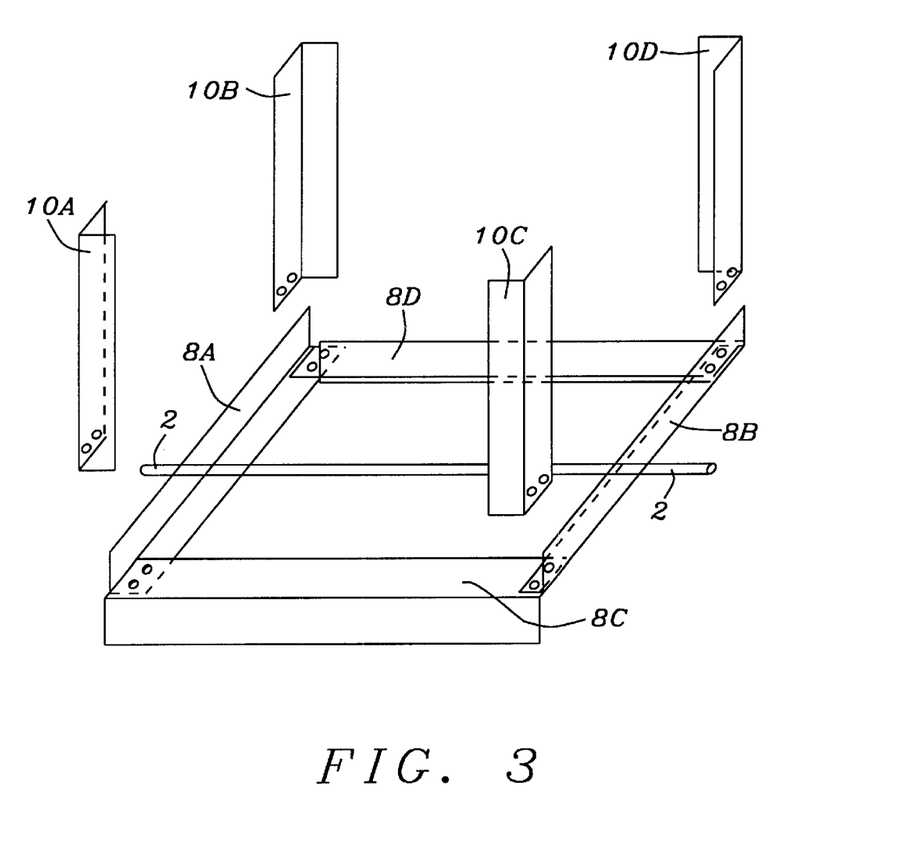
FIG. 3 illustrates the deck frame assembly with vertical angle bars for support of plastic grid and adjusting height of cutting bar above the lake bottom.
Figure 5A:
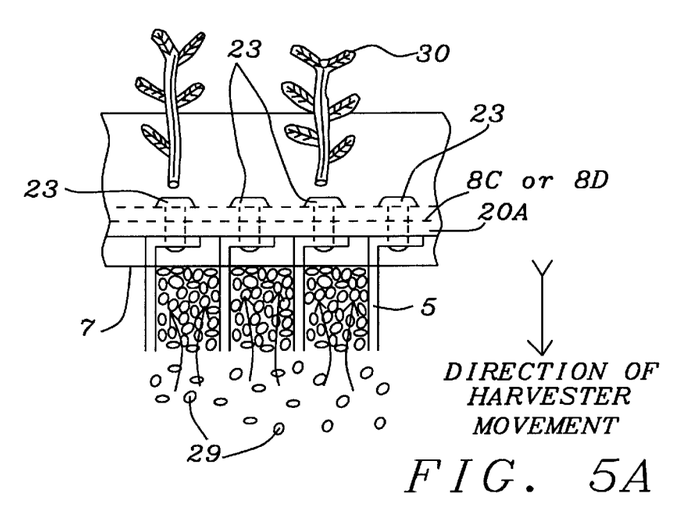
FIGS. 5A, 5B, 5C and 5D show three methods and optional devices of the invention for abrading and cutting bottom growing aquatic plants.
Figure 5B:
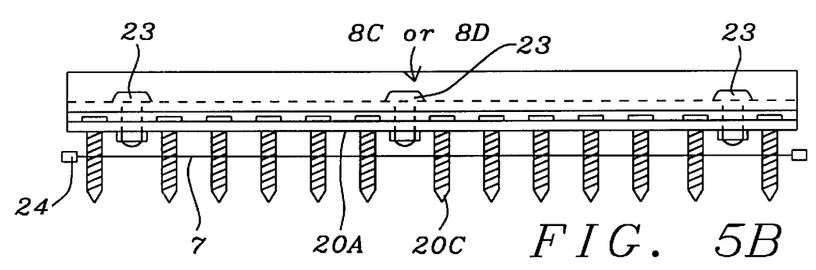
Figure 5C:
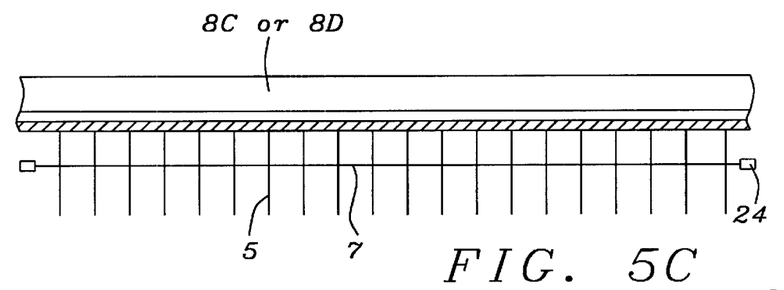
Figure 5D:
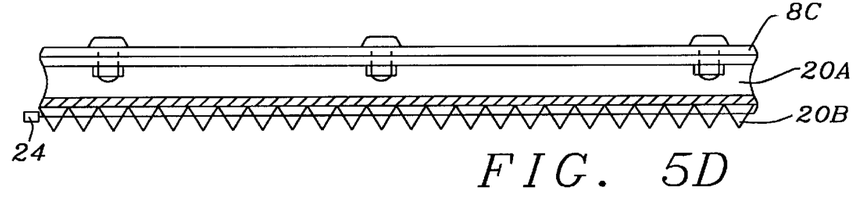

Referring to FIG. 3, the harvester deck 6 includes a horizontal, rectangular frame assembly of planar horizontal aluminum angle bars 8A, 8B, 8C, and 8D connected as shown with, for example bolts 23 with washers and nuts for attachment of a deck bottom 6 which supports the harvester 1A load of harvested aquatic vegetation. The deck 6 could be made of plywood. The mobile harvester 1A deck frame 6 includes front angle bar 8C and back aluminum angle bar 8D which are assembled with vertical component of the aluminum angle bars 8C and 8D directed downward toward the lake bottom B for attachment of optional cutting bars 20A as seen in FIGS. 5A, 5B, .5C, 5D with a plurality of planar, aquatic plant stem guides and compaction bars 5 with transverse stainless steel cutting filament 7 having, for example wire diameter of the order of 0.01 to 0.029 inches. An optional attachment of replacement bar is shown in FIG. 5D using accessory transverse add-on bar 20A with triangular knives 20B and metal cutting filament 7 or with optional attachment of replacement bar 20A with planar threaded fastener guides 20 with transverse cutting filament 7. Aquatic plant cutting filament 7 is fastened to bars 5, 20B or 20C by filament tension hardware 24 shown in FIGS. 5B, 5C and 5D. It is an option of the operator to use the stainless steel cutting filament 7 with methods 20B or 20C to enhance plant stem cutting efficiency where stem coarseness, strength or number of plant stems per square foot is more efficient for any given situation. Add-on optional attachment bars with 5, 20B or 20C are simply bolted onto the front or back aluminum angles 8C or 8D of the harvester frame 6. Planar bars 5, triangular cutting blades 20B and threaded fasteners 20C guide and wedge plant stems into transverse cutting filament 7 which is common to 5, 20B or 20C alternatives.

Referring to FIG. 5A, a fragmented and exploded view of planar deck 6 is shown wherein plant stem guide compaction bars and stainless steel filament 7 illustrate aquatic plant stems 29 cut typically 6 to 8 inches above the lake bottom being compacted within the spaces between guide bars 5 and wedged against metal cutting filament 7 wherein plant stems 29 are severed and cut plants 30 flow and are collected into plastic grid or net 12. Obviously, the compaction and indexing process is applicable to cutting methods 20B and 20C.

Referring to FIGS. 1, 3, and 5A, 5B, 5C, 5D, an important objective of the present invention is shown wherein the bottom growing aquatic plants 30 in FIG. 5A are severed at a predetermined distance above the water body bottom B to minimize the disturbance of the lake bottom sediment ecology which could otherwise result in the release of benthic phosphorus back into the water and thereby enhancing more aquatic plant growth. This is achieved by limiting vertical movement of the cutting bars 20A (transverse filament), 20B (planar, transverse triangular mowing knives) and 20C (planar screw-type bar guides), selectively attached to transverse harvester deck bars 8C and 8D, by use of eyebolts 18A, 18B, 18C, 18D through harvester deck vertical angles 10A, 10B, 10C, 10D at the appropriate distance from deck 6, and eyebolts 18E, 18F through rigid harvester handle 17 at the appropriate distance from axel 2 to line up with eyebolts 18A, 18B, 18C, 18D. The length of chains 14A, 14B are adjusted so that quick links 14C, 14D when connected optionally to eyebolts 18A, 18B and chain links 14A, 14B through handle 17 effectively limit the aquatic plant cutting distance of bars 20A, 20B and 20C to a minimum of for example, about 6 inches above lake water bottom B. FIG. 3 shows holes where bolts 13 will connect vertical and horizontal angle bars with bolts 13 (not shown).

Figure 7A:
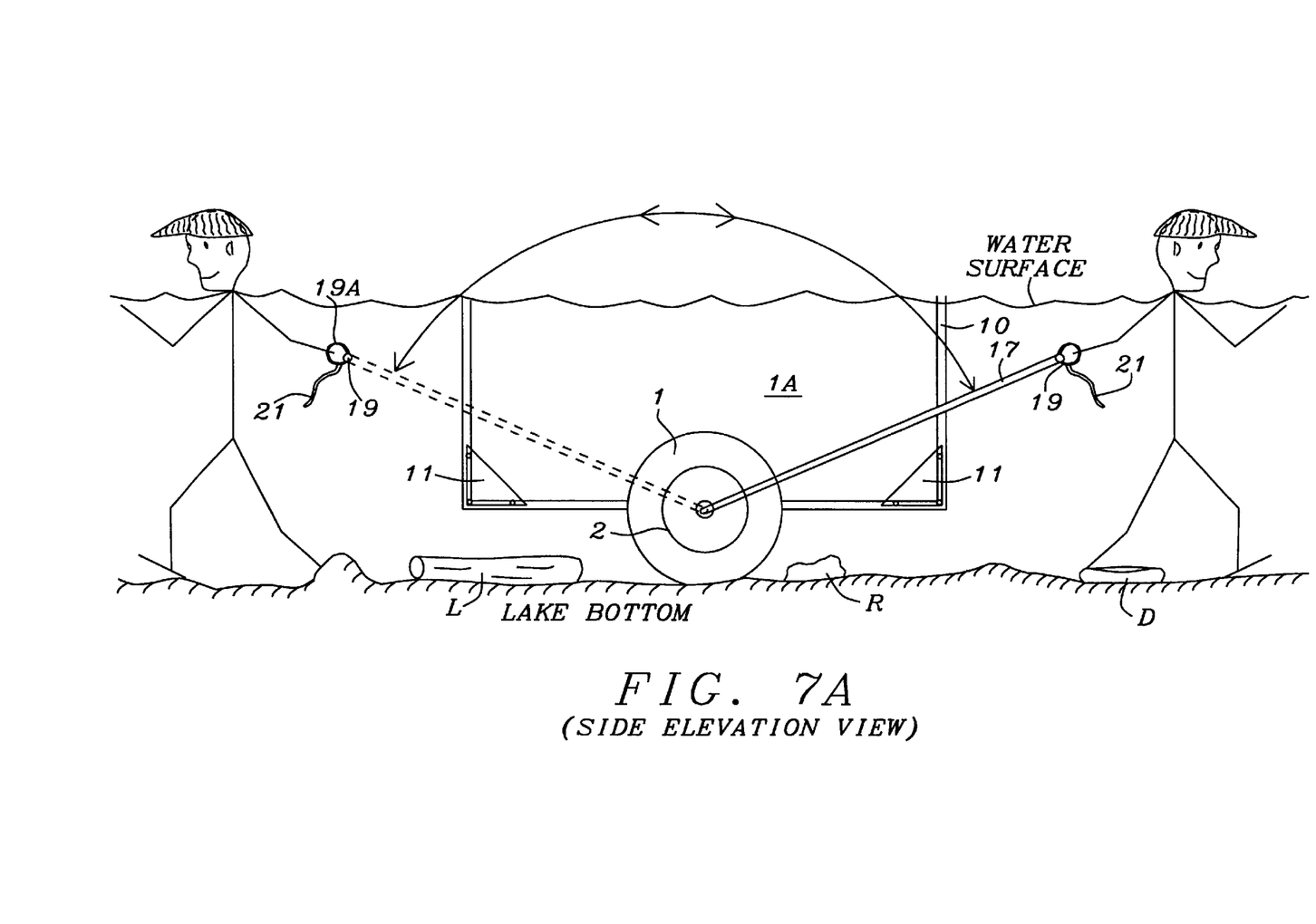
FIGS. 7A and 7B illustrate the method of manually operating the harvesting device on lake bottom by an elevation view of the vertically mobile handle and method of maintaining the plant cutting devices clear of bottom object and debris.
Figure 7B:
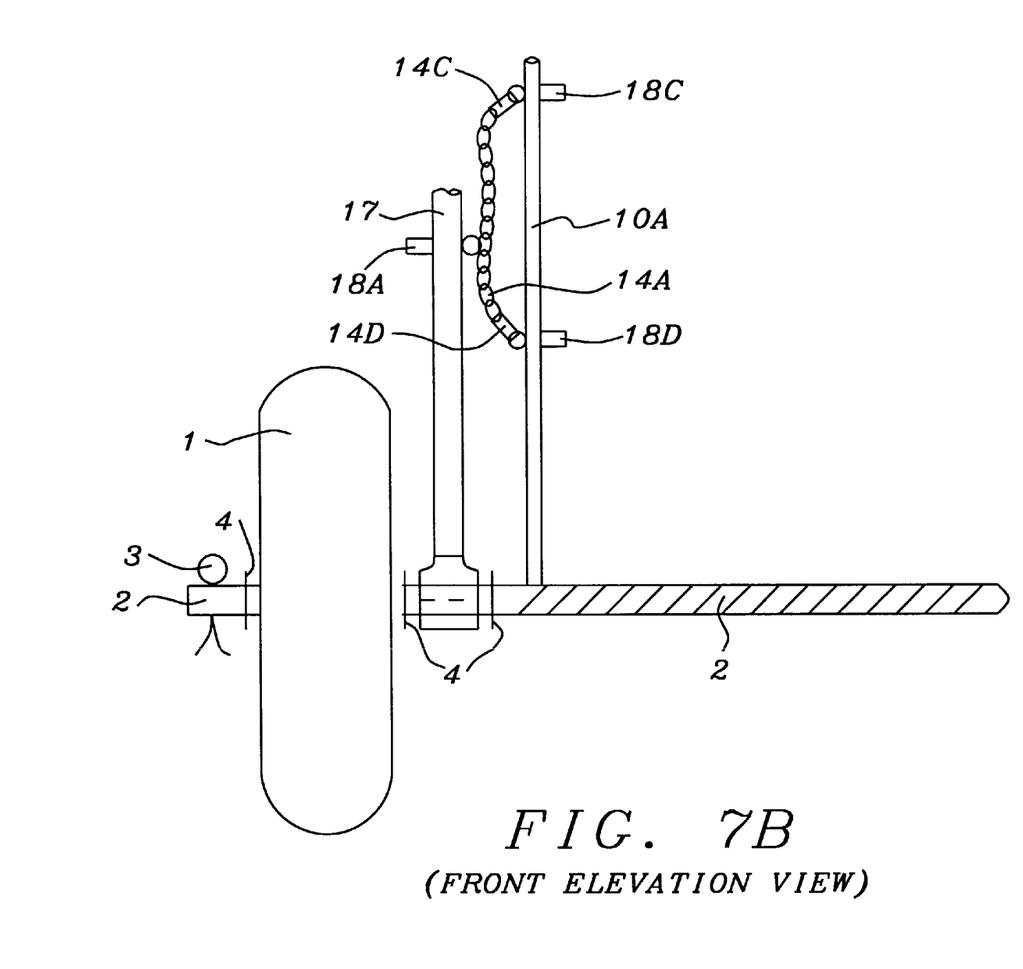

In addition to cutting aquatic vegetation above said water body bottom B as described above the present invention positions the aquatic plant cutting devices 20A and 20C at sufficient distance above said water bottom B so that harvester 1A can be pulled or pushed by one person above and over the most common bottom laying objects, such as rocks R, logs L or debris D that would impede or block the manual pulling or pushing of the harvester along the water body bottom B as shown in FIG. 7A and FIG. 7B.

An improved mobile multifunctional apparatus and method is shown in FIG. 1 and FIGS. 2A, 2B, 2C, 2D where sections of flexible, plastic grid or net illustrated as 12A, 12B, 12C, 12D, 12E, 12F collect cut aquatic plant stems 29 as the harvester is pulled or pushed through the water body. The plastic grid sections are attached to the vertical aluminum angle bars shown in FIG. 3 as 10A, 10B, 10C 10D of the harvester 1A by means of four upper and four lower eyebolts fastened to vertical aluminum angle bars using spring loaded metal snap hooks as needed to connect the plastic grids to the harvester. Other means could be used to secure the plastic grid or net to the harvester frame.

The front (not shown) and back sections 12D of plastic grid as seen in FIG. 1 are removable depending on the direction of said harvester 1A movement such that the cut aquatic plants 29 flow into the harvester plastic grid 12A, B, D, E opposite to direction of motion of said harvester where the front section of the plastic grid when used is of the same material as 12D and has been temporarily removed for cutting. A section of plastic grid 12F previously placed on the deck 6 of said harvester 1A before harvesting is started, is connected by snap hooks at the bottom of back plastic grid 12D. 12E is the top plastic grid as seen in FIG. 1. For dumping the harvested water body vegetation at an onshore location the back section of said plastic grid 12D is disconnected from the harvester aluminum frame verticals 10B and 10C. By manually pulling plastic grid section 12D from the back to the front of the harvester 1A, for example the cut vege-tation is deposited onshore for dewatering and subsequent trans-porting to a composting location for reuse of the nutrient phosphorus contained in the removed vegetation for gardening or other agricultural projects.

Figure 4:
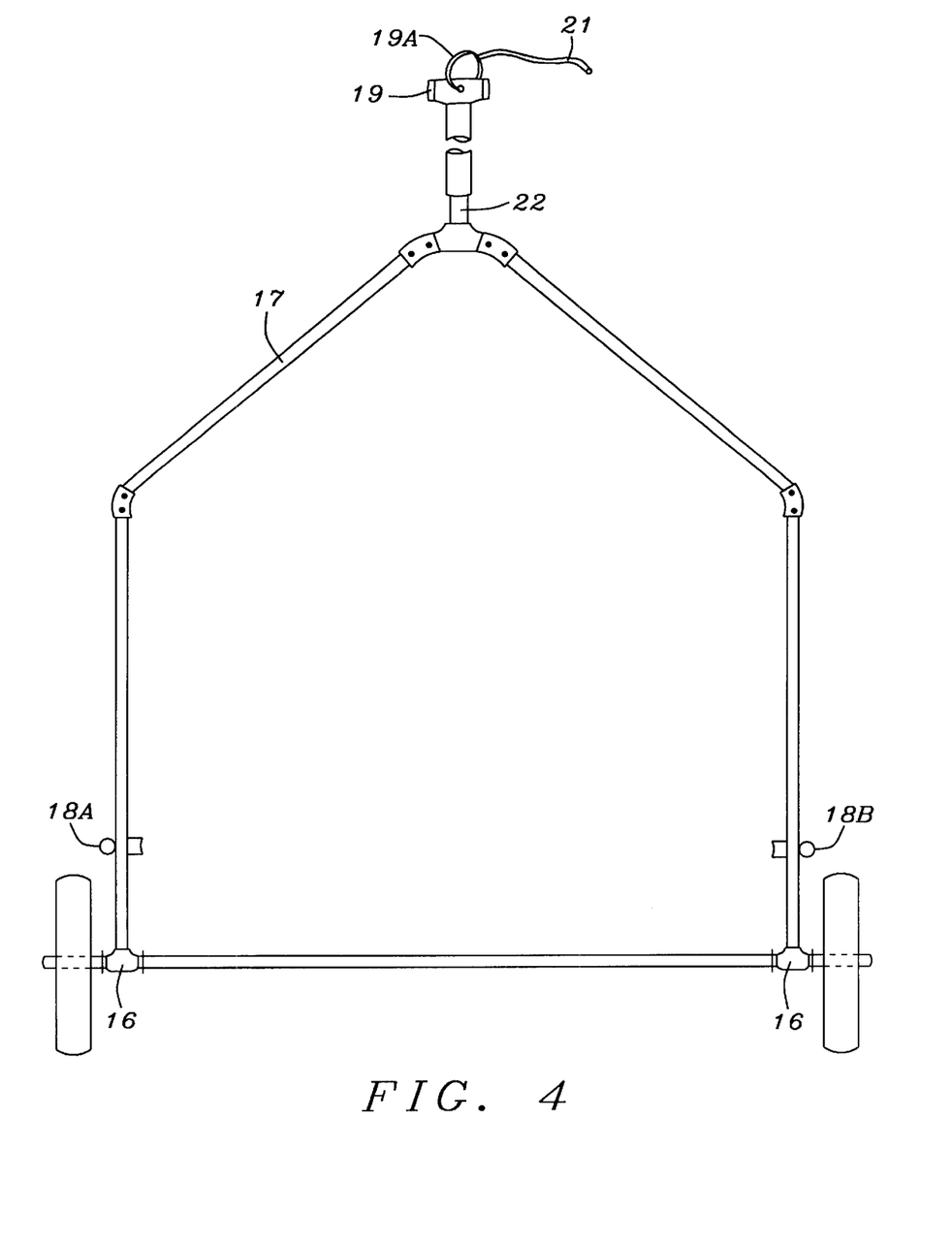
FIG. 4 is a perspective view of the handle components for pulling or pushing the harvesting apparatus.

The push or pull handle 17 shown in FIGS. 1A, 4, and 7A can be operated by one person from either end of said harvester. The vertically movable handle 17 is comprised of a rigid pipe and appropriate fittings and is connected to said harvester 1A at axel 2 inside of each wheel 1 to rotatable, pipe "Tees" 16 at the inside of each wheel of said harvester 1A as seen in FIG. 2A. The "Tees" 16 are fitted with nipple inserts on the long axis and over axel 2 to take up slack of vertically mobile handle 17. The handle 17 extending from the harvester axel 2 at each wheel 1 are configured to a single rigid handle using standard pipe and fittings. A grip 19 composed of piping is useful for manually pushing or pulling harvester 1A offshore or on shore. As illustrated in FIG. 7B, the handle 17 is moveable vertically in an arc of 180 degrees to pull or push said harvester 1A, cut and harvest aquatic plants by simply moving the handle 17 over the deck to the opposite end of the harvester.

Figures 6A, 6B:
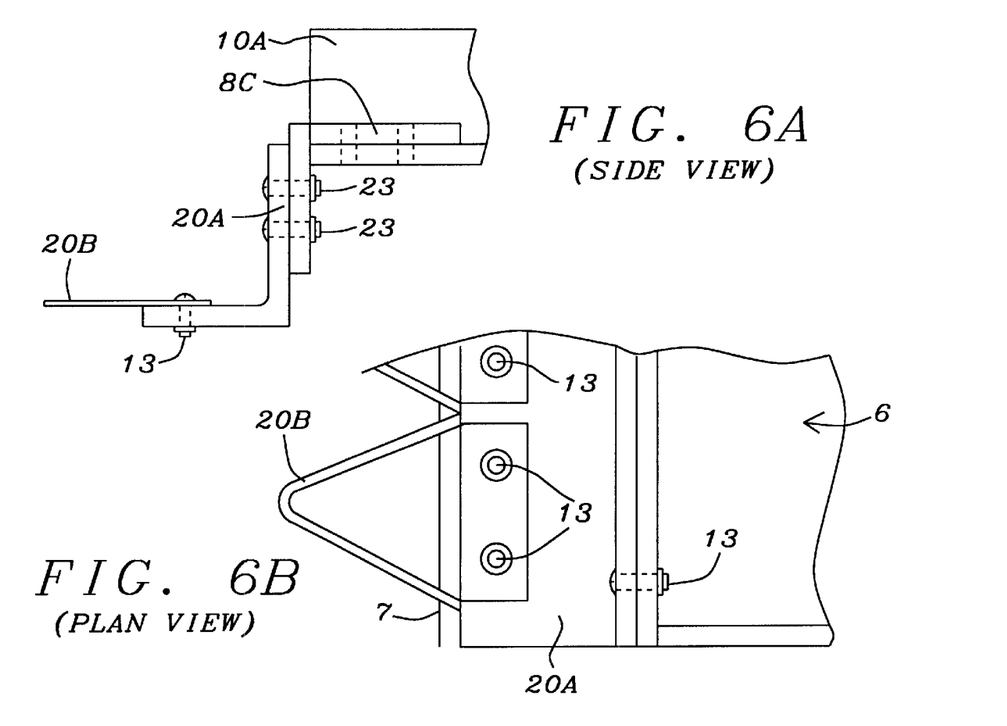
FIGS. 6A, 6B, 6C and 6D display assembly details by elevation and plan views of two methods of the invention for cutting aquatic plant stems using easy bolt-on bars.

Referring to FIGS. 6A and 6B, there is shown an optional cutting structure and method that use planar triangular knives. The planar triangular knives are attached With bolts to aluminum angle bars 20A and frame angle 8C at either front or back of the harvester frame. The transverse cutting filament 7 is shown, for example positioned about ½ inch from the "V" notch formed by adjacent triangular cutting blades.

Figures 6C, 6D:
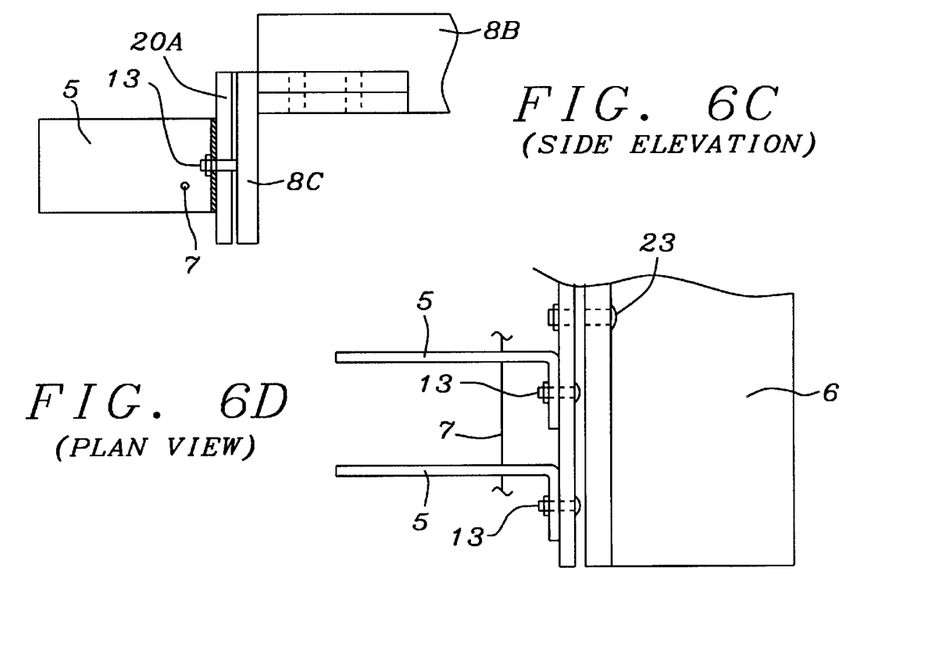

Referring now to FIG. 6C and FIG. 6D, there is shown a cutting structure and method that uses vertical plant stem guide and compaction bars 5 bolted to optional attachment bar 20A. Transverse cutting filament 7 is shown passing through the bars 5 at a distance of, for example 1 inch from the support bar 20A.

Figure 8A:
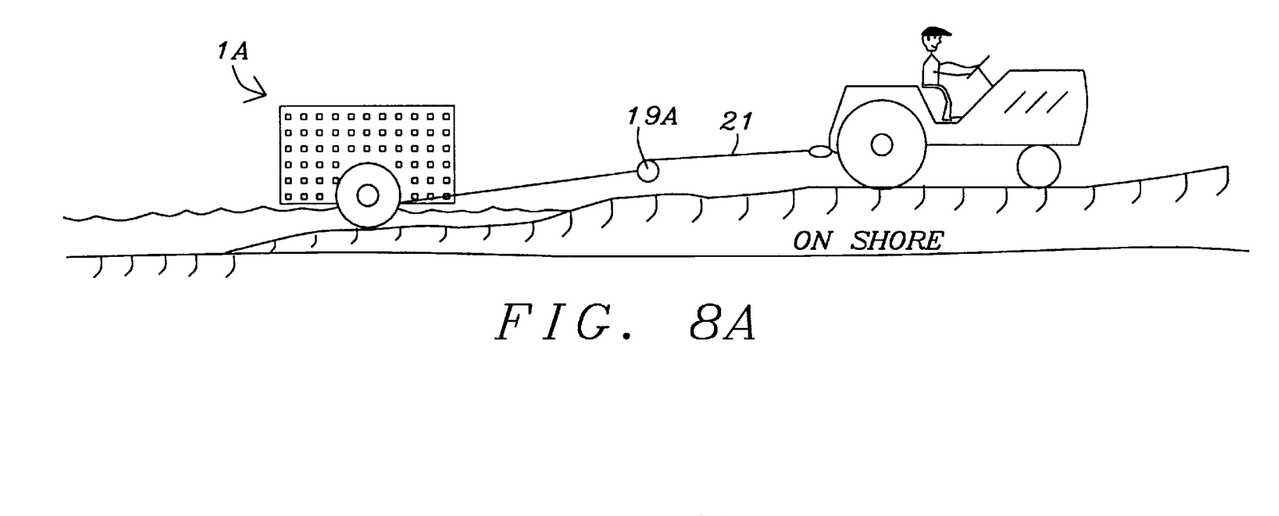
FIGS. 8A and 8B show perspective views of the harvesting apparatus being pulled by offshore and onshore optional auxiliary powered devices.
Figure 8B:
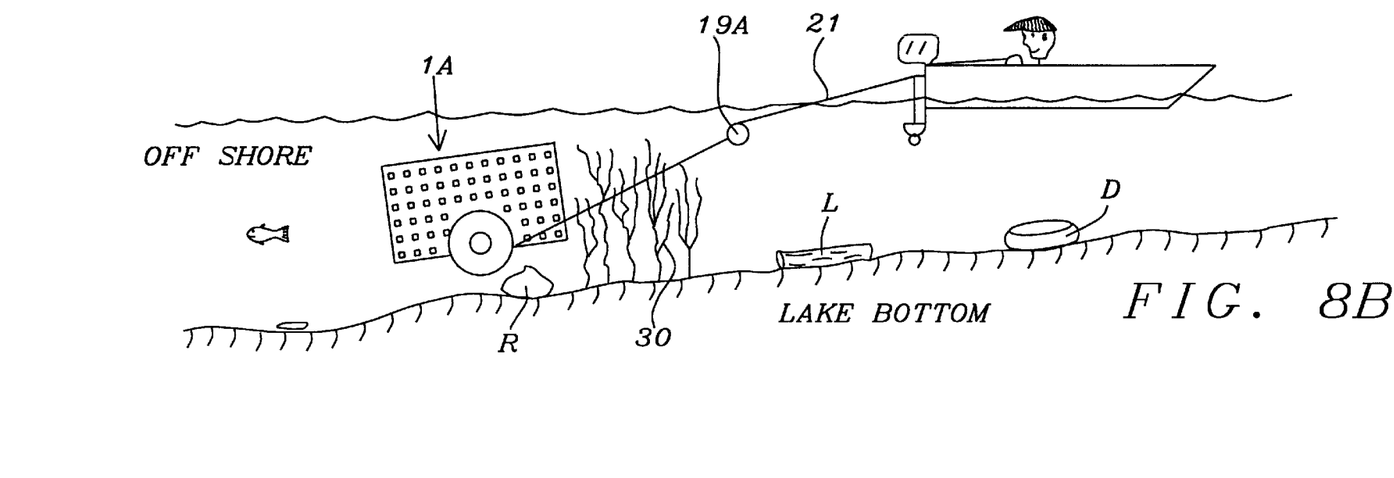

Referring to FIG. 8A and 8B, it is shown how the harvester can be used with the aid of onshore or offshore power equipment. Ring 19A is provided at handle grip 19 for optional connection by rope, chain or cable to an offshore powered device, such as a boat seen in FIG. 8A or onshore tractor as seen in FIG. 8B or winch to move harvester 1A.

The mobility of the manual harvester 1A can be improved by balancing the loaded equipment weight against the harvester buoyancy. Since the in-water density of the harvested aquatic plants is about the same as water, the in-water weight of the harvester 1A may be considered a constant whether full or empty of harvested vegetation 29, except possibly for friction factors. By adjusting air volume in the tires on wheel 1 and if necessary by attachment of a variable floatation device 31 which can be air-filled or sand-filled to the harvester deck 6, the wheel-load on the lake bottom B is adjusted for maximum mobility of the harvester 1A for a given situation of lake bottom B firmness.

The following is the summary of a numbered part of this harvesting apparatus.

1A harvester
1 wheels with air-filled tires
2 steel axel for harvester wheels
3 cotter pin through axel to hold wheels in place
4 washers to hold wheels in place against cotter pins
5 one of a plurality of vertical closely spaced planar metal bars to guide plant stems into the cutting filament 7
6 harvester deck
7 transverse stainless steel filament for cutting plant stems
8A,B,C,D horizontal aluminum angle deck frames to support deck and aquatic plant cutting attachments
9 pipe "U" bolts for fastening deck frame to harvester axel
10A,B,C,D vertical aluminum angle bars to support flexible plastic grid that collects cut aquatic plants
11 galvanized metal reinforcing plates for support of vertical aluminum angle bars
12A,B,C,D,E separate sections of flexible plastic grid with rectangular openings to collect cut aquatic plants
13 bolts for fastening the deck to horizontal aluminum angle deck frame
14A,B chains to control height of cutter bar above lake bottom
14C,D metal quick links to connect chain and handle eyebolt to limit vertical downward movement of the deck by connecting to 18A and 18B (FIG. 7B)
15 eye bolt through aluminum vertical angle for attachment of flexible plastic grid with snap hooks
16 pipe "Tees" over axel to attach movable harvester
17 harvester handle
18A,B eye bolts through harvester handle to limit downward vertical movement of harvester deck
18C,D,E,F eye bolt through the deck vertical aluminum angles 10A, 10B, 10C 10D for attachment to chains to control vertical height of deck above lake bottom
19 handle grip of harvester 1A
9A steel ring connection for pulling harvester, on shore or off shore with optional use of power devices
20A accessory transverse aluminum angle bar for attachment of optional cutting methods such as triangular knives, metal guide bars threshold guide bars and, metal cutting filaments
20B planar triangular knives and metal cutting filaments
20C threaded guide bolts bars that abrade plant stems while being compacted against metal stem cutting filaments
rope or cable for pulling harvester with optional powered device offshore or onshore
pipe and fittings for extension of harvester handle assembly
harvester assembly bolts for each frame and attachable bars with cutting devices
metal filament tension fitting
PVC pipe that is filled with either sand or air for harvester buoyancy adjustment
bolts that fasten galvanized triangular reinforcing plates 11 to deck frame
cut vegetation stems
aquatic plants
buoyancy control tubes for harvester deck As shown in the preferred embodiments, the novel harvesting apparatus and methods of harvesting provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A manual mobile apparatus for harvesting bottom growing aquatic vegetation in shallow areas of water that does not disturb the water bottom ecology comprising:

a perforated self-draining deck with wheels on a transverse axel;

means for attaching aquatic cutting devices to either or both ends of said deck;

means attached to said deck including a flexible plastic grid enclosed on all sides and by a top cover to collect the cut aquatic vegetation;

means connected to said wheels to control minimal distance of said cutting devices above the bottom; and a manual push or pull handle attached to said deck with wheels with vertical mobility from front to back over the deck that can reverse direction of motion without turning the apparatus.

2. The harvester of claim 1 wherein said handle is vertically moveable in an arc of up to 180 degrees so that said harvester can be pushed or pulled without turning said harvester.

3. The harvester of claim 1 wherein said means for compacting include compacting guide bars which guide and wedge the aquatic vegetation against said mean for cutting said vegetation.

4. The harvester of claim 1 wherein said means for cutting said vegetation is a stainless steel filament.

5. The harvester of claim 1 wherein said means for cutting said vegetation are transverse triangular mowing knives.

6. The harvester of claim 1 wherein said flexible plastic grid for collecting the cut said vegetation is a flexible plastic net.

7. A manual harvester for cutting and harvesting bottom growing aquatic vegetation in shallow areas of water that does not disturb the water bottom ecology comprising:

a deck;

wheeled means connected to said deck for moving said harvester through said vegetation and for adjusting the cutting height above said water bottom;

said wheeled means includes a handle for pushing or pulling said harvester and said handle is vertically moveable in an arc of up to 180 degrees so that said harvester can be pushed or pulled without turning said harvester;

means for compacting said vegetation mounted on said deck;

means for cutting said vegetation associated with said means for compacting and mounted on said deck; and means for collecting the cut said vegetation on said deck including a flexible plastic grid enclosed on all sides and by a top cover to collect the cut aquatic vegetation.

8. The harvester of claim 7 and further comprising:

a non-on-board power source to aid in the movement of said harvester.

9. The harvester of claim 8 wherein said power source is on a boat or on the shore.

10. The harvester of claim 7 wherein said means for compacting include compacting guide bars which guide and wedge the aquatic vegetation against said means for cutting said vegetation.

11. The harvester of claim 7 wherein said means for cutting said vegetation is a stainless steel filament and/or transverse triangular mowing knives.

12. The method for cutting and harvesting bottom growing aquatic vegetation in shallow areas of water that does not disturb the water bottom ecology comprising:

providing a harvester with a deck; wheeled means connected to said deck and means attached to said deck including a flexible plastic grid enclosed on all sides and by a top cover to collect the cut aquatic vegetation;

moving said harvester through said vegetation at a set height above said water bottom;

compacting said vegetation and wedging the vegetation against a cutting means for cutting said vegetation;

cutting and collecting the cut said vegetation on said deck into said flexible plastic grid wherein said water bottom ecology is unaffected by the said cutting and harvesting; and removing said flexible plastic grid from said deck and disposing of the cut said vegetation from said flexible plastic grid.

13. The method of claim 12 wherein said deck wheeled means is moved by a handle that can be moved in an arc of up to 180 degrees so as to be able to either push or pull said harvester without turning the harvester.

14. The method of claim 12 wherein said moving said harvester is done with aid of a non-on-board power source.

15. The method of claim 14 wherein said non-on-board power source is carried on a boat which has a connection to said harvester to aid in said moving of said harvester.

16. The method of claim 14 wherein said non-on-board power source carried on the shore which has a connection to said harvester to aid in said moving of said harvester.

17. The method of claim 12 wherein said cutting is accomplished using a stainless steel filaments.

18. The method of claim 12 wherein said cutting is accomplished using transverse triangular mowing knives.

\* \* \* \* \*